No. 764,868. PATENTED JULY 12, 1904.
G. ROBERTSON.
SOUND BOX.
APPLICATION FILED DEC. 1, 1903.
NO MODEL.

Witnesses
D. W. Gould,
Benj. R. Catlin

Inventor
George Robertson
By Charles M. Catlin
Attorney

No. 764,868. Patented July 12, 1904.

UNITED STATES PATENT OFFICE.

GEORGE ROBERTSON, OF TOLEDO, OHIO.

SOUND-BOX.

SPECIFICATION forming part of Letters Patent No. 764,868, dated July 12, 1904.

Application filed December 1, 1903. Serial No. 183,337. (No model.)

*To all whom it may concern:*

Be it known that I, GEORGE ROBERTSON, a resident of Toledo, in the county of Lucas and State of Ohio, have invented certain new and useful Improvements in Sound-Boxes; and I do hereby declare the following to be a full, clear, and exact description of the invention, such as will enable others skilled in the art to which it pertains to make and use the same.

This invention relates to sound-boxes for disk talking-machines, and particularly to the supporting means for the needle-arm, the object being to improve and simplify such means.

Figure 1:
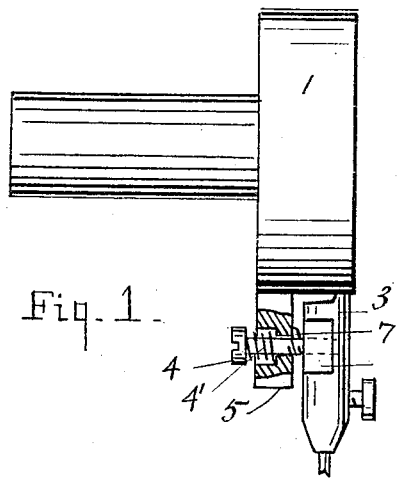
Figure 2:
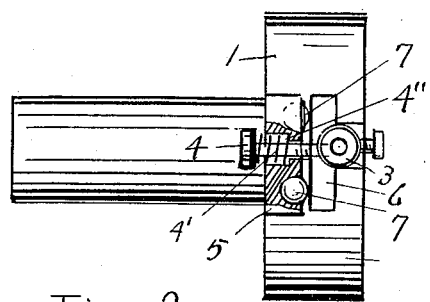
Figure 3:
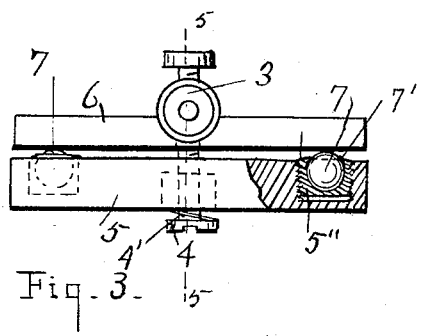
Figure 4:
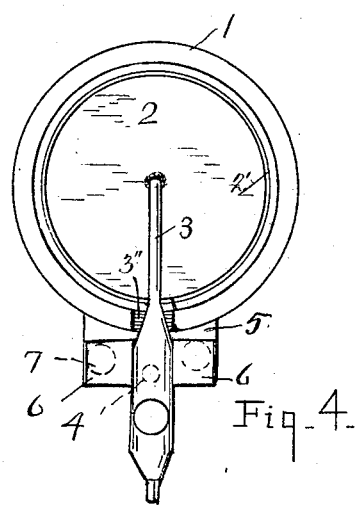
Figure 5:
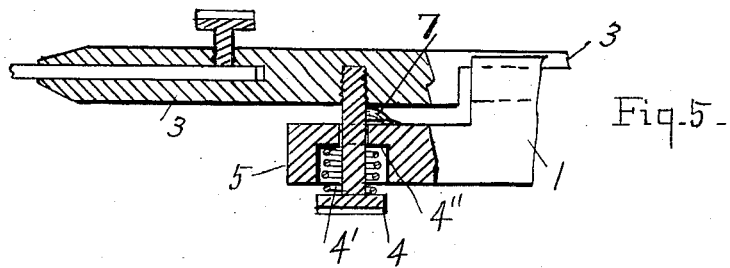

In the accompanying drawings, Figures 1 and 2 are side views at right angles to each other of a sound-box having the improvements. Fig. 3 is an enlarged side view of a modification of the bearing for the needle-arm. Fig. 4 is a front view of the sound-box, and Fig. 5 is a partial sectional view on line 5 5 of Fig. 3 on an enlarged scale.

Numeral 1 denotes the sound-box body, 2 the diaphragm, and 3 the needle-arm. This arm is connected to the center of the diaphragm and extends radially beyond the periphery of the box, where it is supported by a tension-spring 4' and screw or pin 4, which screw or pin is held loosely in a hole in the projection 5 of box 1, and the projection is either integral or non-integral with the box, preferably the former, as it is safer. In said hole is the spiral tension-spring which presses against the head of the screw and against a ledge 4" in the hole. Thus the screw (and hence the needle-arm) is supported by the tension of said spring.

Just outside of the box needle-arm 3 is provided with side wings or bearing parts 6 6, the smooth flat inner side of which rests on the hard smooth rounded parts, preferably polished steel balls 7, which are in depressions in the extension or which are in sockets 5", screwed into holes in part 5. The balls are held securely in place by overlying material extending outward beyond the centers of the balls, so as to hold the balls from falling out when they are not under wings 6. The balls may thus be held stationary or they may be sufficiently loose in their sockets to allow them to turn.

The screw or pin 4 draws the wings 6 of the needle-bar against balls 7. When arm 3 is vibrated by a record, wings 6 move slightly on the round parts 7 where said parts touch. Evidently the balls may be fixed to wings 6 instead of to part 5. The balls can bear directly against the flat inner side of wings 6 without the formation of special bearing places. The balls wear the opposing surface so little as to be negligible. The reproducer is therefore not interfered with.

It will be seen that there is but one tension-screw used and that but one is necessary, owing partly to the coöperating action of the wings and balls.

I have shown, Fig. 4, the screw 4 located below the centers of balls 7; but this is not essential. The action is, however, better when said screw is at one side or the other of a line through the center of the balls.

In order to lower the arm 3 to a plane quite near to the plane of the diaphragm, a notch 3" for said arm is formed in the outer edge of the sound-box. In this way arm 3 is brought down nearly to the wire ring 2', which holds the diaphragm.

What I claim is—

1. A talking-machine sound-box having a suitable case, diaphragm, and a needle-arm operatively connected at one end to the diaphragm, a single screw adjustably supported in the needle-arm and extending loosely through an extension from the box, a spring between the extension and the head of the screw, the rounded bearing against which the arm presses normally, said screw engaging the arm at a point at one side of a plane transverse to the arm and passing through the center of the rounded bearing, whereby adjustment of said screw changes the tension of the arm on the diaphragm.

2. A talking-machine sound-box having a suitable case, diaphragm, and needle-arm, means for securing said arm outside of the case consisting of a projecting part 5, and a single screw extending therethrough into said arm, and balls on opposite sides of the axis of said needle-arm against which the arm bears and on which it can move.

3. A talking-machine sound-box having a suitable case, diaphragm, needle-arm with opposite side wings, a single screw for securing said arm, and balls on opposite sides of the axis of the needle-arm against which said wings bear and on which they can move.

4. A talking-machine sound-box having a case, diaphragm, and needle-arm, a single screw for securing said arm, and balls on opposite sides of the axis of said needle-arm against which the arm bears on opposite sides of said axis of the needle-arm and also at one side of a plane transverse to the needle-arm and passing through the axis of the screw.

5. A talking-machine sound-box having a suitable case, diaphragm, and needle-arm, a notch in the case for the arm, a part 5 projecting from the case at the rear of said notch, and means in part 5 supporting the arm.

6. A sound-box case having a projecting part, a diaphragm and a needle-arm in said box-case, the arm connecting with the diaphragm and extending over the projecting part, and means consisting of a single screw extending through the projecting part into the needle-arm, and a spiral tension-spring between the screw and the projecting part for adjustably securing the needle-arm thereon, and balls forming a bearing for the needle-arm.

In testimony whereof I have signed this specification in the presence of two subscribing witnesses.

GEORGE ROBERTSON.

Witnesses:
   CLEM V. WAGNER,
   L. M. WILLIAMSON.